United States Patent
Ammari et al.

(10) Patent No.: US 11,972,240 B2
(45) Date of Patent: Apr. 30, 2024

(54) SYSTEMS AND METHODS FOR AUTOMAPPING SOURCE CODE TO MACHINE CODE

(71) Applicant: Samsung Electronics Co., Ltd., Suwon-si (KR)

(72) Inventors: Ramzi Ammari, Santa Clara, CA (US); Changho Choi, San Jose, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 81 days.

(21) Appl. No.: 17/674,739

(22) Filed: Feb. 17, 2022

(65) Prior Publication Data

US 2023/0176842 A1 Jun. 8, 2023

Related U.S. Application Data

(60) Provisional application No. 63/285,749, filed on Dec. 3, 2021.

(51) Int. Cl.
*G06F 8/41* (2018.01)

(52) U.S. Cl.
CPC ................................ *G06F 8/48* (2013.01)

(58) Field of Classification Search
CPC .......................................................... G06F 8/41
See application file for complete search history.

(56) References Cited

U.S. PATENT DOCUMENTS

| | | | |
|---|---|---|---|
| 5,675,803 A | 10/1997 | Preisler et al. | |
| 6,151,701 A | 11/2000 | Humphreys et al. | |
| 6,263,489 B1 * | 7/2001 | Olsen | G06F 11/3628 717/134 |
| 6,553,565 B2 | 4/2003 | Click, Jr. et al. | |
| 7,155,426 B2 | 12/2006 | AL-Azzawe | |
| 7,496,906 B2 * | 2/2009 | Black-Ziegelbein | G06F 11/3668 717/124 |
| 7,526,757 B2 | 4/2009 | Levine et al. | |
| 7,653,899 B1 * | 1/2010 | Lindahl | G06F 11/3612 717/125 |
| 7,818,721 B2 | 10/2010 | Sundararajan et al. | |
| 8,060,869 B1 | 11/2011 | Panchenko et al. | |
| 8,359,582 B2 | 1/2013 | Elliott | |

(Continued)

FOREIGN PATENT DOCUMENTS

CN 108959069 A 12/2018

OTHER PUBLICATIONS

Vouillon, Jérôme et al., "From Bytecode to JavaScript: the Js_of_ocaml Compiler," Software Practice and Experience, 0000; 00: 1-23.

(Continued)

*Primary Examiner* — Jae U Jeon
(74) *Attorney, Agent, or Firm* — Lewis Roca Rothgerber Christie LLP (57) ABSTRACT

Systems and methods for mapping a location in a source code to a location in a machine code are disclosed. An identifier of the source code and an identifier of a first location of the source code are received. A marker is inserted in association with the source code based on the identifier of the first location. The source code is compiled into machine code. A second location associated with the marker is identified in the machine code. A third location is returned based on identifying the second location.

18 Claims, 4 Drawing Sheets

(56) References Cited

U.S. PATENT DOCUMENTS

| | | | |
|---|---|---|---|
| 8,881,115 B2 | 11/2014 | Bates et al. | |
| 9,292,414 B2 | 3/2016 | Kiel et al. | |
| 10,466,985 B2 | 11/2019 | Gampe et al. | |
| 10,534,692 B2 | 1/2020 | Hejlsberg et al. | |
| 10,540,262 B2 | 1/2020 | Ramesh et al. | |
| 10,678,677 B1 | 6/2020 | Kuris et al. | |
| 10,783,056 B2 | 9/2020 | Raviv et al. | |
| 11,080,166 B2 | 8/2021 | Du et al. | |
| 11,119,739 B1 * | 9/2021 | Allen | H04L 63/0263 |
| 11,126,415 B1 * | 9/2021 | Mestery | G06F 8/315 |
| 2004/0210865 A1 * | 10/2004 | Shimura | G06F 9/45516 |
| | | | 717/100 |
| 2007/0074168 A1 | 3/2007 | Bates et al. | |
| 2007/0288909 A1 | 12/2007 | Cheung et al. | |
| 2013/0262930 A1 * | 10/2013 | Nakamura | G06F 11/3664 |
| | | | 714/27 |
| 2015/0199183 A1 * | 7/2015 | Nakagawa | G06F 8/70 |
| | | | 717/123 |
| 2019/0369868 A1 * | 12/2019 | Tang | G06F 3/04812 |

OTHER PUBLICATIONS

Zaremba, Wojciech et al., "JaBEE—Framework for Object-oriented Java Bytecode Compilation and Execution on Graphics Processor Units," 2012, 10 pages.

EPO Extended European Search Report dated Apr. 17, 2023, issued in corresponding European Patent Application No. 22209001.1 (8 pages).

* cited by examiner

```
 1 #include <linux/bpf.h>
 2 #include "bpf_helpers.h"
 3 #include <stdlib.h>
 4
 5 int bpf_prog(void *ctx) {
 6
 7     char buf[] = "Hello World!\n";
 8
 9     bpf_trace_printk(buf, sizeof(buf));
10
11     bpf_trace_printk(buf, sizeof(buf));
12
13     bpf_trace_printk(buf, sizeof(buf));
14     exit(1);
15     bpf_trace_printk(buf, sizeof(buf));
16
17     return 0;
18
19
20 }
```

```
Disassembly of section .text:
bpf_prog:
    0:  b7 01 00 00 0a 00 00 00                     r1 = 10
    1:  6b 1a fc ff 00 00 00 00                     *(u16 *)(r10 - 4) = r1
    2:  b7 01 00 00 72 6c 64 21                     r1 = 560229490
    3:  63 1a f8 ff 00 00 00 00                     *(u32 *)(r10 - 8) = r1
    4:  18 01 00 00 48 65 6c 6c 00 00 00 00 6f 20 57 6f    r1 = 8022916924116329800
    6:  7b 1a f0 ff 00 00 00 00                     *(u64 *)(r10 - 16) = r1
    7:  bf a6 00 00 00 00 00 00                     r6 = r10
    8:  07 06 00 00 f0 ff ff ff                     r6 += -16
    9:  bf 61 00 00 00 00 00 00                     r1 = r6
   10:  b7 02 00 00 0e 00 00 00                     r2 = 14
   11:  85 00 00 00 06 00 00 00                     call 6
   12:  bf 61 00 00 00 00 00 00                     r1 = r6
   13:  b7 02 00 00 0e 00 00 00                     r2 = 14
   14:  85 00 00 00 06 00 00 00                     call 6
   15:  bf 61 00 00 00 00 00 00                     r1 = r6
   16:  b7 02 00 00 0e 00 00 00                     r2 = 14
   17:  85 00 00 00 06 00 00 00                     call 6
   18:  b7 01 00 00 01 00 00 00                     r1 = 1                  BP location = line 17+1
   19:  85 10 00 00 ff ff ff ff                     call -1
```

SYSTEMS AND METHODS FOR AUTOMAPPING SOURCE CODE TO MACHINE CODE

CROSS-REFERENCE TO RELATED APPLICATION(S)

The present application claims priority to and the benefit of U.S. Provisional Application No. 63/285,749, filed Dec. 3, 2021, entitled "MECHANISM TO AUTO MAP NATIVE PROGRAM CODE C/C++/PYTHON TO EBPF BYTE-CODE TO BE ABLE TO SET BREAKPOINTS FOR DEBUGGING," the entire content of which is incorporated herein by reference.

FIELD

One or more aspects of embodiments according to the present disclosure relate to debugging tools, and more particularly, to a tool for debugging bytecode instructions by setting breakpoints in the corresponding source code.

BACKGROUND

Debugging is one of many important features of a processing unit, including a computation storage unit. When debugging is needed for machine code instructions, difficulties may arise as machine code may be more complex than source code. In addition, knowledge about the machine code, including machine code semantics, may be needed for performing debugging of the machine code instructions.

The above information disclosed in this Background section is only for enhancement of understanding of the background of the present disclosure, and therefore, it may contain information that does not form prior art.

SUMMARY

Embodiments of the present disclosure are directed to a method for mapping a location in a source code to a location in a machine code. According to the method, an identifier of the source code and an identifier of a first location of the source code are received. A marker is inserted in association with the source code based on the identifier of the first location. The source code is compiled into machine code. A second location associated with the marker is identified in the machine code. A third location is returned based on identifying the second location.

According to one embodiment, the identification of the source code is a name of the source code, and the identifier of the first location of the source code is a line number of the source code.

According to one embodiment, the marker is a preset function call. The preset function call may be an exit function call.

According to one embodiment, compiling of the source code stops in response to the exit function call.

According to one embodiment, the machine code is an Extended Berkeley Packet Filter (eBPF) bytecode.

According to one embodiment, the second location is a line number of the machine code associated with the marker.

According to one embodiment, the third location is a line number above the line number of the machine code associated with the marker.

According to one embodiment, the source code is copied into a temporary source code file, wherein the marker is inserted into the temporary source code file, and the compiling is of the temporary source code file.

Embodiments of the present disclosure are also directed to a system for mapping a location of a source code to a location of a machine code. The system includes a processor, and a memory. The memory stores instructions that, when executed by the processor, cause the processor to: receive an identifier of the source code and an identifier of a first location of the source code; insert a marker in association with the source code based on the identifier of the first location; compile the source code into machine code; identify a second location in the machine code associated with the marker; and return a third location based on identifying the second location.

As a person of skill in the art should recognize, embodiments of the present disclosure provide a mechanism for debugging machine code instructions by mapping a location of the source code where a breakpoint may want to be inserted, into a location of the machine code. In this manner, a programmer may interact with the source code in engaging in a debugging exercise using breakpoints, instead of attempting to debug the machine code directly.

These and other features, aspects and advantages of the embodiments of the present disclosure will be more fully understood when considered with respect to the following detailed description, appended claims, and accompanying drawings. Of course, the actual scope of the invention is defined by the appended claims.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

DETAILED DESCRIPTION

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, in the drawings, the relative sizes of elements, layers, and regions may be exaggerated and/or simplified for clarity.

Inserting breakpoints in a computer program may be a useful debugging technique used by programmers. For example, a breakpoint may be inserted at a particular line of the program to pause execution of the program. During the pause, the programmer may inspect the state of registers, memory, logs, files, and/or acquire other knowledge about the program during its execution.

When the program that gets loaded and executed are machine code instructions, such as, for example, an Extended Berkeley Packet Filter (eBPF) bytecode instructions, debugging of the machine code may be difficult. For example, if debugging is attempted using breakpoints, the programmer may need an understanding of the low level machine code instructions, including its semantics, to know where to insert the breakpoints.

In general terms, embodiments of the present disclosure are directed to automatically mapping a line in a high level source code, to a location in the corresponding machine code. The machine code may correspond to the source code if the machine code is generated based on the source code (e.g. by a compiler that compiles that source code). The mapping may be performed by a mapping tool that may be installed, for example, at a host device. The mapping tool may take as input the name of the source code program, and a line number in the source program, where, for example, a breakpoint is to be inserted.

In one embodiment, the tool makes a temporary copy of the source code program, and inserts a preset high level command, label, or tag (collectively referred to as a marker) into the temporary copy, at a location corresponding to the line number. The marker may be for example, an exit function call that halts execution of the temporary source program and the generating of associated machine code when the source code is compiled. The marker may also be a label, tag, or any other command or function that generates a distinguishable code or effect in the machine code instructions.

In one embodiment, the mapping tool compiles the temporary source program and generates low-level machine code (also referred to as bytecode) based on the temporary source program. The bytecode may be saved in a temporary bytecode file. The mapping tool may search the temporary bytecode file for bytecode that corresponds to the marker. In this regard, when the marker is an exit function call that halts generating of the bytecode, the tool may identify the bytecode at the end of the temporary bytecode file as corresponding to the exit function call. In one embodiment, the tool returns a line number in the temporary bytecode file based on locating the bytecode for the marker. For example, the line number that is returned may be the line number above the line where the bytecode for the marker is located. The programmer may use the returned line number for debugging the original bytecode file. For example, the programmer may use the returned line number to insert a breakpoint at the line number.

Figure 1:
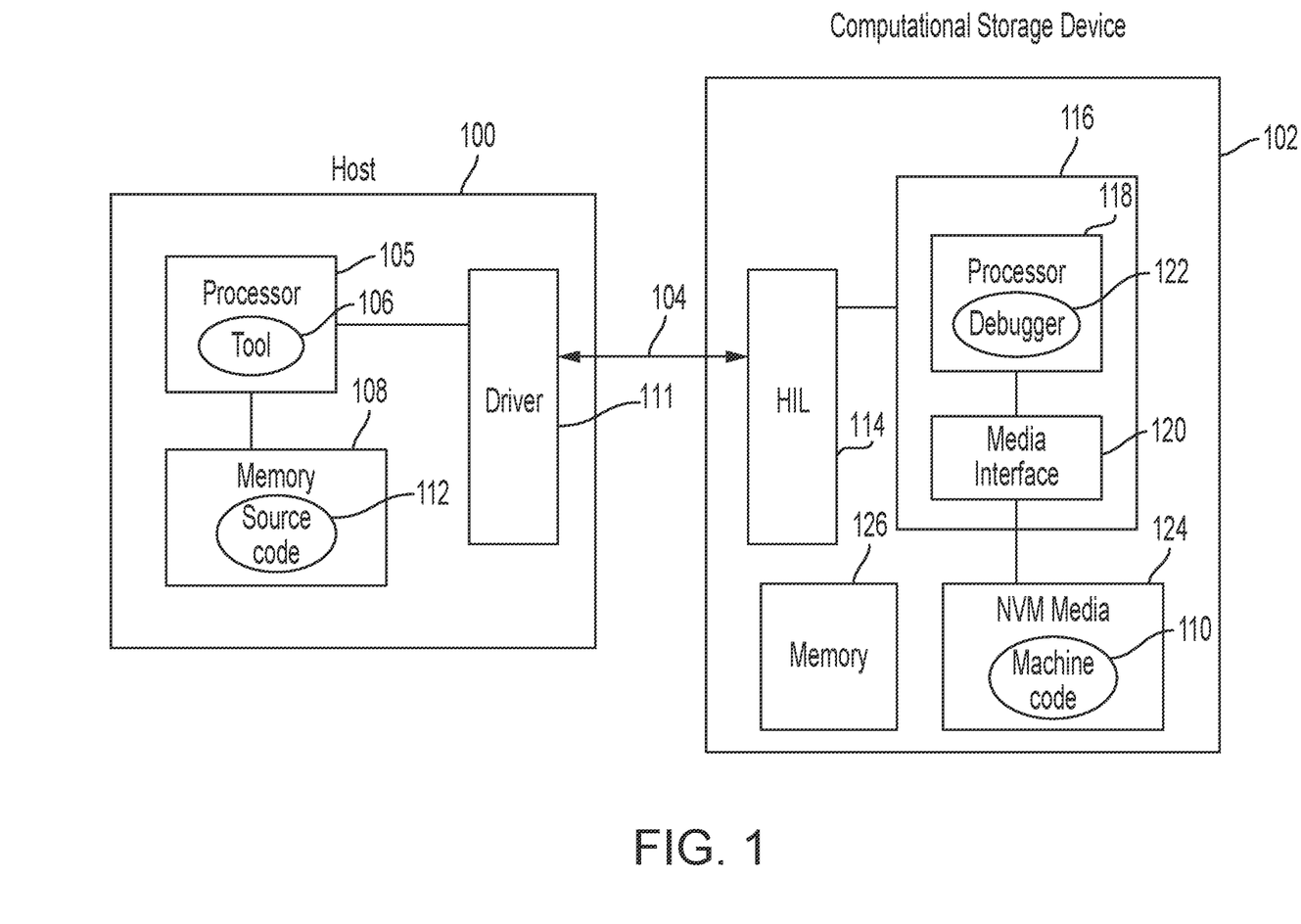
FIG. 1 is block diagram of a system for automapping source code to machine code according to one embodiment.

FIG. 1 is block diagram of a system for automapping source code to machine code according to one embodiment. The system may include a host computing device 100 coupled to a computational storage device 102 over a wired or wireless storage interface 104 including Ethernet, fiber channel, and/or other storage interface. The computational storage device 102 may be a state drive (SSD) with an embedded processor such as a field programmable gate array (FPGA), an SSD controller, and/or a discrete co-processor.

In one embodiment, the storage interface 104 is a Compute Express Link (CXL). In one embodiment, the host device 100 may transfer and receive data to and from the storage device 102 over the storage interface 104, using a storage interface protocol. The storage interface protocol may be, for example, a non-volatile memory express (NVMe) protocol or any other like protocol.

In one embodiment, the host 100 includes a processor 105 coupled to a memory 108. The processor 105 may be configured to run one or more software applications that are stored in the host memory 108. One such application may be a mapping tool 106 for mapping a location (e.g. line number) in a source code 112, to a location (e.g. line number) of a corresponding machine code 110. The source code 112 may be generated by a programmer using a human-readable programming language such as, for example, C, C++, Python, and/or the like. The machine code 110 may be, for example, an eBPF bytecode, although embodiments are not limited thereto.

The mapping tool 106 may be used, for example, for debugging the machine code 110. For example, the mapping tool 106 may receive as input a line number of the source code 112 in which a breakpoint is to be inserted, and the tool may return a corresponding line number of the machine code 110 for inserting the breakpoint. By engaging in debugging and inserting of breakpoints using the higher level source code, a more natural and efficient debugging of the machine code may be achieved.

In one embodiment, the host 100 includes a device driver 112 configured to interface with the storage device 102. In one embodiment, the device driver 110 is implemented as software instructions that are stored in the host memory 108, and which are executed by the processor 105.

In one embodiment, the storage device 102 includes a host interface layer (HIL) 114 for interfacing between the device driver 112 of the host 100, and a device control subsystem 116. The device control subsystem 116 may include, without limitation, one or more processors 118 and one or more media interface(s) 120. The one or more processors 118 may be configured to execute computer-readable instructions including, for example, a debugger 122 for debugging the machine code 110. The machine code 110 may be loaded into the storage device 102. In one embodiment, the debugger 122 is configured to receive a location (e.g. line number) of the machine code 110 provided by the mapping tool 106, for inserting a breakpoint based on the identified location (e.g. a line below the identified location). When the debugger 122 executes the machine code 110, the machine code may halt execution when the breakpoint is reached, and output register values prior to the breakpoint.

In one embodiment, the one or more processors 118 may interact with NVM media 124 over the media interface 120 for effectuating write or read actions. The NVM media 124 may include one or more types of non-volatile memory such as, for example, flash memory. In one embodiment, the machine code 110 may be loaded onto the NVM media 124, and retrieved for execution by the processor 118 via the media interface 120. In some embodiments, the storage device 102 may retrieve the machine code 110 from an external source (e.g. the host or another device). The machine code may be stored into the memory 126 or into the NVM media 124 for later retrieval.

In one embodiment, the storage device 102 further includes an internal memory 126 for short-term storage or temporary memory during operation of the storage device 102. The internal memory 126 may include a DRAM (dynamic random access memory), SRAM (static random access memory), and/or DTCM (Data Tightly Coupled Memory). For example, the machine code 110 may be loaded from the NVM media 124 onto the internal memory 126 for execution.

In some embodiments, the storage device 102 is inside a chassis (not shown) that includes an Ethernet switch, a baseboard management controller (BMC), and a PCIe switch. The Ethernet switch may provide an Ethernet connection to the storage device 102 (e.g., smart SSD) over a midplane, and the PCIe switch may provide a management interface to the storage device over the midplane. The BMC can program the storage device 102 according to an instruction given by a system administrator. The BMC can manage the internal components of the chassis including the Ethernet switch, the PCIe switch, and the storage device 102. The BMC can support PCIe and/or system management bus (SMBus) interfaces for the system management. The BMC can configure the storage device 102 and program the Ethernet switch. In some embodiments, the Ethernet switch provides network connectivity between the host 100 and the storage device 102 via the storage interface 104.

Figure 2:
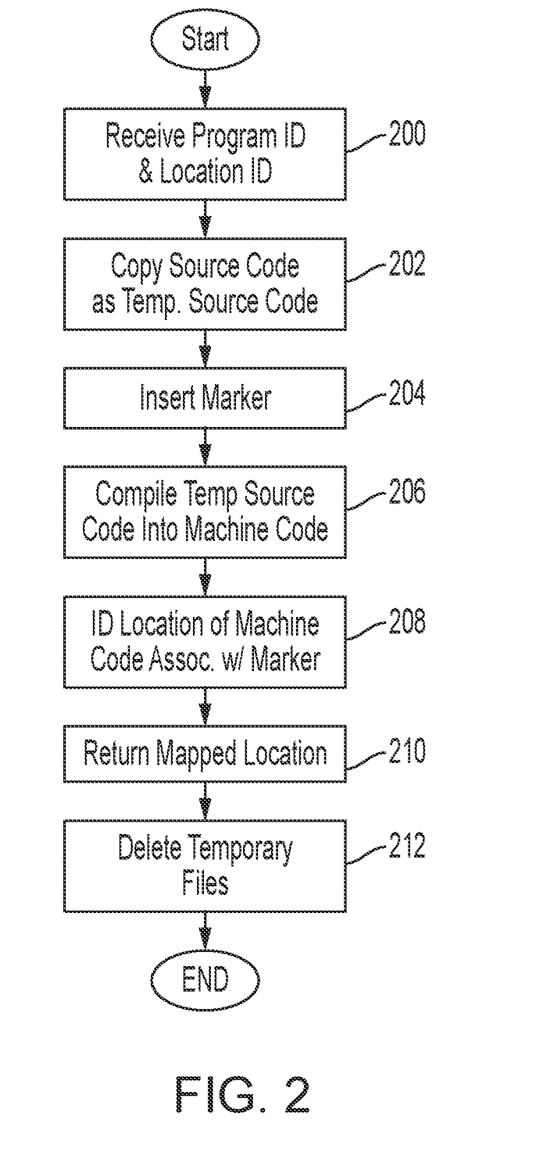
FIG. 2 is a flow diagram of a process for mapping a location in a source code to a location in a machine code according to one embodiment.

FIG. 2 is a flow diagram of a process for mapping a location in the source code 112 to a location in the machine code 110 according to one embodiment. The process starts, and in act 200, the mapping tool 106 receives as input, an identifier (e.g. name) of the source code 112 and a first location of the source code that is to be mapped to a machine code location. The input location may be a line number, although embodiments of the present disclosure are not limited thereto. In this regard, the mapping tool 106 provides a graphical user interface (GUI) for receiving the input, although embodiments are not limited thereto. For example, the input may also be received as command line arguments and/or the like.

In act 202, the source code is copied into a temporary source code file, although embodiments are not limited thereto. For example, in one embodiment, edits are made to the original source code, and the edits are undone after the mapping is performed.

In act 204, a marker is inserted into the temporary source code (or the original source code depending on the embodiment) based on the input line number. In one embodiment, the marker is an exit function call that halts execution of the program. In some embodiments, the marker may be a unique label, tag, or the like, provided by the source programming language. In the embodiments where the marker is not an exit function call, multiple markers may be inserted for identifying multiple locations that may want to be debugged. Markers may also different based on the language in which the original source code is written. For example, a C code exit marker will differ in syntax from a Pyton or Java exit marker. In one embodiment, the tool receives as input the marker to use.

In act 206 the mapping tool 106 compiles the temporary source code and generates a temporary machine code in response. In an embodiment where the temporary source code includes the exit function call, the compiling stops upon reaching the exit function call, and no machine code is generated for any source code after the exit function call. In embodiments where a unique label or tag is used as the marker, the entire temporary source code is compiled.

In act 208, the mapping tool 106 identifies the location in the temporary machine code associated with the marker (e.g. the location of the sequence of machine code instructions corresponding to the exit function call in the temporary machine code). In the embodiment where the exit function call is used as the marker, the compiling stops when the exit function call is reached. Thus, the last instruction(s) of the temporary machine code are the instruction(s) associated with the exit function call. In the embodiment where a unique label or tag is used as the marker, the location of the marker in the temporary machine code may be identified by doing a compare of the temporary machine code with the machine code generated by compiling the original source code to obtain a difference.

At block 210, the mapping tool 106 returns a mapped location based on the location of the marker. In one embodiment, the returned mapped location is a line number above the line number of the marker in the temporary machine code. The mapped location may be returned, for example, to the debugger 122 in the storage device 102 for inserting a breakpoint for debugging the machine code 110.

In act 212, the mapping tool 106 deletes the temporary source code and machine code files as they are no longer needed.

Figure 3:
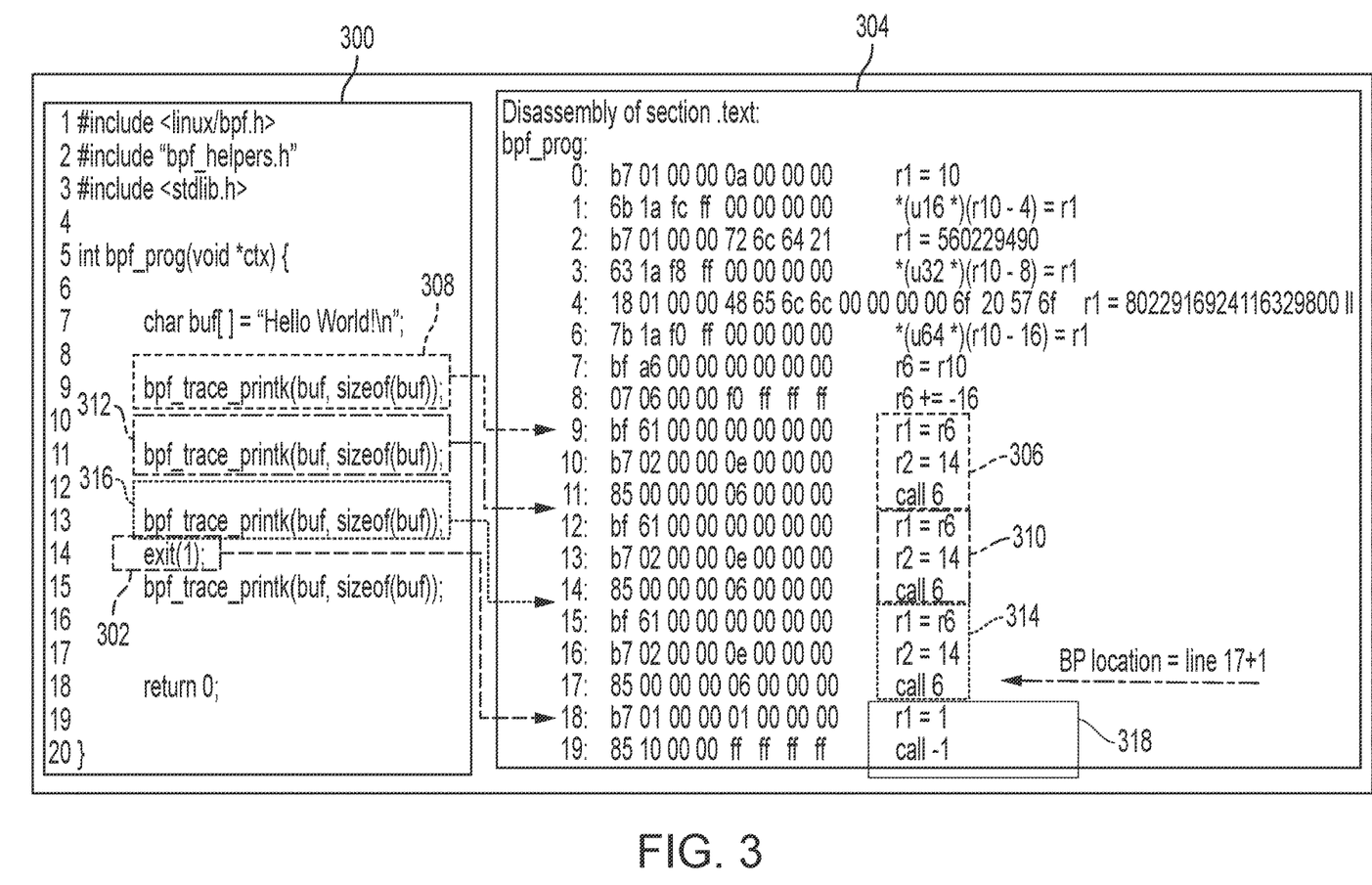
FIG. 3 is a screen shot of an exemplary temporary source code that includes a marker according to one embodiment.

FIG. 3 is a screen shot of an exemplary temporary source code 300 that includes a marker 302 according to one embodiment. In the example of FIG. 3, the marker is an exit function call. The mapping tool 106 may insert the marker in line 14 of the temporary source code 300 in response to receiving an input line number of "14."

Machine code 304 (which may be similar to machine code 110) may be generated in response to compiling the temporary source code 300. In the example of FIG. 3, machine code instructions (lines 9-11) 306 are generated for function 308 in the temporary source code; machine code instructions (lines 12-14) 310 are generated for function 312 in the temporary source code, and machine code instructions (lines 15-17) 314 are generated for function 316 in the temporary source code. For the marker 302 inserted in line 14, the last two lines (lines 18-19) 318 of the machine code correspond to the marker. In one embodiment, the mapping function returns line 17 (the line above line 18 that corresponds to the marker), as an output line number that is mapped to the input line number 14.

Figure 4:
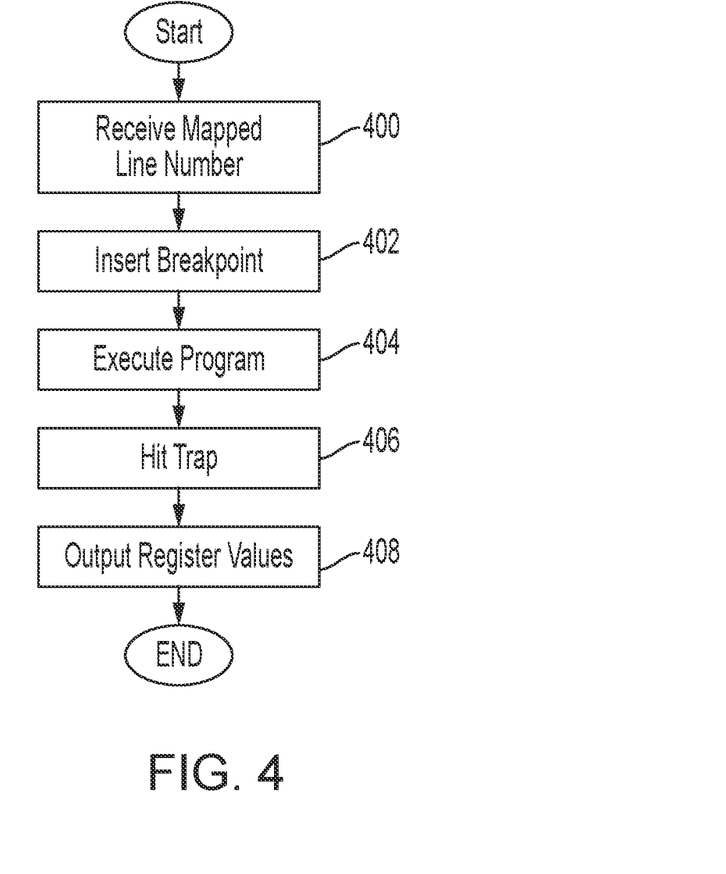
FIG. 4 is a flow diagram of a process executed by a debugger for debugging machine code using breakpoints according to one embodiment.

FIG. 4 is a flow diagram of a process executed by the debugger 122 for debugging the machine code 110 using breakpoints according to one embodiment. The debugger 122 may be invoked, for example, by the mapping tool 106 in response to mapping an input line number of the source code 112, to a line number in the corresponding machine code 110. In this manner, a programmer may engage in the debugging process by interacting with the high level source code 112 instead of attempting to debug the machine code 110 directly.

The process starts, and at block 400, the debugger 122 receives the machine code line number mapped to the input source code line number. In the example of FIG. 3, machine code line number 17 is returned in response to receiving an input line number 14 for the source code.

At block 402, the debugger 122 inserts a breakpoint (also referred to as a trap) below the identified machine code line number. In the example of FIG. 3, a breakpoint is inserted in machine code line number 18.

At block 404, the debugger 122 executes the machine code 110 with the inserted breakpoint.

At block 406, the machine code hits the trap, and at block 408, the debugger 122 outputs register values (e.g. machine code instructions) at the line preceding the trap. For example, if the trap is inserted at line 18 of the machine code, the debugger 122 outputs the register values at line 17. In the example of FIG. 3, the register values at line 17 are as follows:

85 00 00 00 06 00 00 00 call 6

In one embodiment, the register values are provided to the mapping tool 106 for display on a display device. By examining the output register values, the programmer may attempt to identify errors in the machine code 110.

The process may end or not after the register values are output at block 408, depending on the number and types of traps/breakpoints inserted in the source code. In one embodiment, multiple traps/breakpoints are inserted into the source code. In such an embodiment, the process returns to block 404 (e.g. in response to a user command) after a first breakpoint is hit and the related register values are output at block 408, to continue execution of the program until a second breakpoint is hit and its register values are output. The process continues until there are no more breakpoints left to execute.

It should be understood that the sequence of steps of the processes in FIGS. 2 and 4 are not fixed, but can be modified, changed in order, performed differently, performed sequentially, concurrently, or simultaneously, or altered into any desired sequence, as recognized by a person of skill in the art.

The term processor used herein may refer to one or more processors and/or one or more processing cores. The one or more processors may be hosted in a single device or distributed over multiple devices (e.g. over a cloud system). A processor may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processor, as used herein, each function is performed either by hardware configured, i.e., hard-wired, to perform that function, or by more general-purpose hardware, such as a CPU, configured to execute instructions stored in a non-transitory storage medium (e.g. memory). A processor may be fabricated on a single printed circuit board (PCB) or distributed over several interconnected PCBs. A processor may contain other processing circuits; for example, a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. Also, unless explicitly stated, the embodiments described herein are not mutually exclusive. Aspects of the embodiments described herein may be combined in some implementations.

As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

Although exemplary embodiments of a system and method for automapping source code to machine code have been specifically described and illustrated herein, many modifications and variations will be apparent to those skilled in the art. Accordingly, it is to be understood that a system and method for automapping source code to machine code constructed according to principles of this disclosure may be embodied other than as specifically described herein. The disclosure is also defined in the following claims, and equivalents thereof.

What is claimed is:

1. A method for mapping a location in a source code to a location in a machine code, the method comprising:
compiling a first source code for generating a first machine code;
identifying a first location of the first source code;
inserting a marker into the first location of the first source code, and generating a second source code;
compiling the second source code for generating a second machine code;
identifying a second location in the second machine code associated with the marker; and
inserting a breakpoint, different from the marker, into a third location of the first machine code based on the second location identified in the second machine code.

2. The method of claim 1 further comprising:
receiving an identification of the source code and an identifier of the first location of the source code, wherein the identification of the source code includes a name of the source code, and the identifier of the first location of the source code includes a line number of the source code.

3. The method of claim 1, wherein the marker is a preset function call.

4. The method of claim 3, wherein the preset function call is an exit function call.

5. The method of claim 4, wherein compiling of the source code stops in response to the exit function call.

6. The method of claim 1, wherein the machine code is an Extended Berkeley Packet Filter (eBPF) bytecode.

7. The method of claim 1, wherein the second location is a line number of the machine code associated with the marker.

8. The method of claim 1 further comprising:
executing the first machine code;
identifying the breakpoint based on the executing of the first machine code; and
outputting a state associated with the machine code based on the identifying of the breakpoint.

9. The method of claim 1, wherein the source code is copied into a temporary source code file, wherein the marker is inserted into the temporary source code file, and the compiling is of the temporary source code file.

10. A system for mapping a location of a source code to a location of a machine code, the system comprising:
- a processor; and
- a memory, wherein the memory stores instructions that, when executed by the processor, cause the processor to:
  - compile a first source code for generating a first machine code;
  - identify a first location of the first source code;
  - insert a marker into the first location of the first source code, and generating a second source code;
  - compile the second source code for generating a second machine code;
  - identify a second location in the second machine code associated with the marker; and
  - insert a breakpoint, different from the marker, into a third location of the first machine code based on the second location identified in the second machine code.

11. The system of claim 10, wherein the instructions further cause the processor to:
- receive an identification of the source code and an identifier of the first location of the source code, wherein the identification of the source code includes a name of the source code, and the identifier of the first location of the source code includes a line number of the source code.

12. The system of claim 10, wherein the marker is a preset function call.

13. The system of claim 12, wherein the preset function call is an exit function call.

14. The system of claim 13, wherein the instructions that cause the processor to compile the source code further cause the processor to stop compiling the source code in response to the exit function call.

15. The system of claim 10, wherein the machine code is an Extended Berkeley Packet Filter (eBPF) bytecode.

16. The system of claim 10, wherein the second location is a line number of the machine code associated with the marker.

17. The system of claim 16, wherein the instructions further cause the processor to:
- execute the first machine code;
- identify the breakpoint based on the executing of the first machine code; and
- output a state associated with the machine code based on the identifying of the breakpoint.

18. The system of claim 10, wherein the instructions further cause the processor to:
- copy the source code into a temporary source code file, wherein the instructions that cause the processor to insert the marker include instructions that cause the processor to insert the marker into the temporary source code file, and the instructions that cause the processor to compile include instructions that cause the processor to compile the temporary source code file.

* * * * *